US010682654B2

(12) United States Patent
Kim et al.

(10) Patent No.: US 10,682,654 B2
(45) Date of Patent: Jun. 16, 2020

(54) WATER DISCHARGING DEVICE

(71) Applicant: COWAY CO., LTD., Chungcheongnam-do (KR)

(72) Inventors: Keun Hwan Kim, Seoul (KR); Woo Jin Kang, Seoul (KR); Ju Hyuk Eom, Seoul (KR); Si Jun Park, Seoul (KR); Chang Seob Yoem, Seoul (KR)

(73) Assignee: Coway Co., Ltd (KR)

( * ) Notice: Subject to any disclaimer, the term of this patent is extended or adjusted under 35 U.S.C. 154(b) by 0 days.

(21) Appl. No.: 16/232,753

(22) Filed: Dec. 26, 2018

(65) Prior Publication Data

US 2019/0193092 A1 Jun. 27, 2019

(30) Foreign Application Priority Data

Dec. 26, 2017 (KR) .......................... 10-2017-0179618

(51) Int. Cl.

| | |
|---|---|
| *B05B 1/16* | (2006.01) |
| *F16K 31/44* | (2006.01) |
| *B67D 3/04* | (2006.01) |
| *B05B 1/30* | (2006.01) |
| *F16K 31/60* | (2006.01) |
| *B05B 12/00* | (2018.01) |
| *B05B 15/16* | (2018.01) |
| *B05B 1/28* | (2006.01) |

(Continued)

(52) U.S. Cl.
CPC .......... *B05B 1/1636* (2013.01); *B05B 1/1681* (2013.01); *B05B 1/3046* (2013.01); *B05B 12/0024* (2018.08); *F16K 31/44* (2013.01); *F16K 31/60* (2013.01); *B05B 1/28* (2013.01); *B05B 15/16* (2018.02); *B67D 1/1466* (2013.01); *B67D 3/02* (2013.01); *B67D 3/04* (2013.01); *B67D 3/043* (2013.01)

(58) Field of Classification Search
CPC ..... B05B 1/1636; B05B 1/1681; B05B 15/16; B05B 1/28; B05B 1/3046; B05B 1/16; B05B 12/0024; B67D 1/1466; B67D 3/02; B67D 3/04; B67D 3/043; F16K 31/44; F16K 31/60

See application file for complete search history.

(56) References Cited

U.S. PATENT DOCUMENTS

| | | | | |
|---|---|---|---|---|
| 2,147,084 | A * | 2/1939 | Bouchard | F16K 31/44 137/385 |
| 2,562,212 | A * | 7/1951 | Rogers | G07F 13/00 222/113 |
| 3,298,571 | A * | 1/1967 | Novak | B63C 9/24 222/5 |

(Continued)

*Primary Examiner* — Frederick C Nicolas
(74) *Attorney, Agent, or Firm* — The Farrell Law Firm, P.C.

(57) ABSTRACT

A water discharging device includes a body including a first water channel connected to a water supply source, and a second water channel connected to the first water channel and to an external entity; and an opening and closing portion including a first opening and closing member opening and closing a first opening and closing hole formed in the first water channel, and a second opening and closing member opening and closing a second opening and closing hole formed in the second water channel. The first opening and closing member moves along the first water channel to open and close the first opening and closing hole as the second opening and closing member moves in the second water channel to open and close the second opening and closing hole.

8 Claims, 6 Drawing Sheets

(51) Int. Cl.
*B67D 3/02* (2006.01)
*B67D 1/14* (2006.01)

(56) References Cited

U.S. PATENT DOCUMENTS

| | | | | |
|---|---|---|---|---|
| 3,502,111 A | * | 3/1970 | Hansen | B67D 1/14 137/170.1 |
| 3,612,354 A | * | 10/1971 | Sitton | B67D 1/1466 222/3 |
| 4,271,992 A | * | 6/1981 | Becker | B67D 1/1466 138/40 |
| 4,471,807 A | * | 9/1984 | Lucking | B67D 3/043 137/614.12 |
| 4,475,566 A | * | 10/1984 | Haines | B67B 7/26 137/318 |
| 4,655,374 A | * | 4/1987 | Guerette | B67D 1/1466 222/504 |
| 5,337,775 A | * | 8/1994 | Lane | B65D 77/067 137/68.29 |
| 5,487,493 A | * | 1/1996 | McNabb | B67D 1/1466 222/146.6 |
| 5,683,015 A | * | 11/1997 | Lee | B67D 3/0009 222/146.6 |
| 5,791,523 A | * | 8/1998 | Oh | B67D 3/0009 222/146.6 |
| 6,003,734 A | * | 12/1999 | Oh | B67D 3/0003 141/351 |
| 6,296,157 B1 | * | 10/2001 | Erb | B67D 3/043 222/509 |
| 6,557,585 B2 | * | 5/2003 | Kwak | B67D 1/1466 137/613 |
| 7,513,395 B2 | * | 4/2009 | Labinski | B67D 3/044 137/588 |
| 7,708,164 B2 | * | 5/2010 | Pritchard | A47K 5/1208 222/207 |
| 8,113,239 B2 | * | 2/2012 | Richards | B67D 3/044 137/587 |
| 8,353,428 B2 | * | 1/2013 | Pritchard | B67B 7/26 222/105 |
| 10,077,145 B1 | * | 9/2018 | Boucher | B65D 47/247 |

* cited by examiner

WATER DISCHARGING DEVICE

CROSS-REFERENCE TO RELATED APPLICATION(S)

This application claims benefit of priority to Korean Patent Application No. 10-2017-0179618 filed on Dec. 26, 2017 in the Korean Intellectual Property Office, the disclosure of which is incorporated herein by reference in its entirety.

BACKGROUND

1. Field

The present disclosure relates to a water discharging device.

2. Description of Related Art

Generally, a water discharging device is connected to a water supply source and discharges water externally from a water supply source.

A water discharging device usually includes a water channel through which water passes, the water channel includes an opening and closing hole, and an opening and closing member for opening and closing the opening and closing hole is moveably disposed in the water channel.

The water from the water supply source may pass through the water channel and may be discharged externally by the opening and closing member moving from a position in which the opening and closing hole is closed to a position in which the opening and closing hole is opened in the water channel.

A general water discharging device has been configured such that water may or may not be discharged externally using a single opening and closing member as described above. Accordingly, when the opening and closing member or the opening and closing hole is abraded as the opening and closing member is repeatedly in contact with the opening and closing hole, leakage may occur.

SUMMARY

An aspect of the present disclosure is to provide a water discharging device in which a first opening and closing member may move in a first water channel to open and close an opening and closing hole of the first water channel as a second opening and closing member moves in a second water channel to open and close a second opening and closing hole of the second water channel.

According to an aspect of the present disclosure, a water discharging device includes a body including a first water channel connected to a water supply source, and a second water channel connected to the first water channel and to an external entity; and an opening and closing portion including a first opening and closing member opening and closing a first opening and closing hole formed in the first water channel, and a second opening and closing member opening and closing a second opening and closing hole formed in the second water channel. The first opening and closing member moves along the first water channel to open and close the first opening and closing hole as the second opening and closing member moves in the second water channel to open and close the second opening and closing hole.

The first opening and closing member may include a protrusion protruding from the first opening and closing hole and disposed in the second water channel, and the second opening and closing member may include a pushing portion pushing the protrusion when the second opening and closing member moves in an opening direction of the second opening and closing hole.

The pushing portion may be disposed in a portion of the second water channel between the first opening and closing hole and the second opening and closing hole, and the pushing portion may be inclined such that the pushing portion approaches an internal surface of the second water channel towards the second opening and closing hole.

The first water channel may be configured to be disposed horizontally in the body, and the second water channel may be configured to be disposed vertically in the body.

The opening and closing portion may further include a first elastic member applying elastic force to the first opening and closing member in a closing direction of the first opening and closing hole, and a second elastic member applying elastic force to the second opening and closing member in a closing direction of the second opening and closing hole.

The opening and closing portion may further include a lever member rotatably disposed in the second opening and closing member such that the second opening and closing member moves in the second water channel.

The second water channel may be configured such that a portion of the second water channel connected to an external entity and a portion opposing the portion connected to an external entity are opened, the body may include a cap member covering the portion of the second water channel opposing the portion connected to an external entity, and the second opening and closing member may have a portion penetrating through a through-hole formed in the cap member such that the lever member is rotatably connected.

The body may further include a water channel sealing member configured such that one portion of the water channel sealing member is connected to the second opening and closing member, and the other portion of the water channel sealing member is disposed between the body and the cap member, to prevent water passing through the second water channel from being discharged externally through the through-hole.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
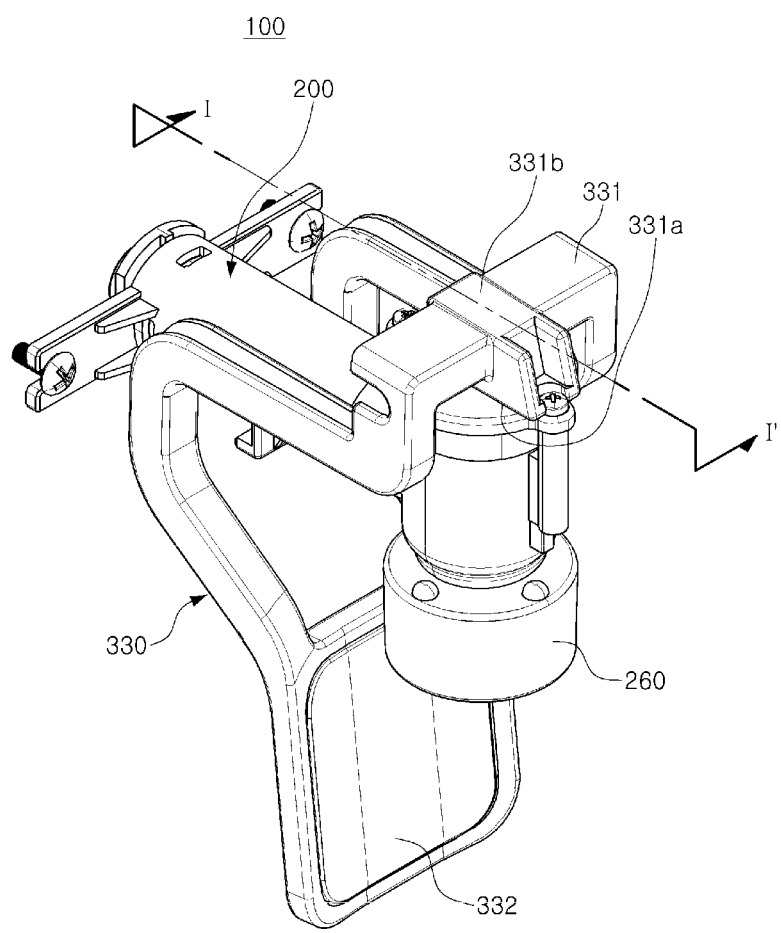
FIG. 1 is a perspective diagram illustrating a water discharging device according to an exemplary embodiment in the present disclosure.

Hereinafter, embodiments of the present disclosure will be described as follows with reference to the attached drawings.

In the descriptions below, the present disclosure will be described based on the most appropriate exemplary embodiments for understanding technical features in the present disclosure. It is to be understood that the technical features of the present invention are not limited to the exemplary embodiments, but the present invention may be implemented as in the exemplary embodiments described herein. Thus, the present invention may be modified in various manners through the exemplary embodiments described herein within the technical scope of the present invention, and the modified exemplary embodiments is to be included in the technical scope of the present invention. Also, to help understanding of the exemplary embodiments, as for reference numerals in the attached drawings, relevant elements among elements having the same function in the exemplary embodiments are indicated by the same or similar form of reference numeral.

In the description below, an exemplary embodiment of a water discharging device will be described with reference to FIGS. 1 to 6.

Figure 2:
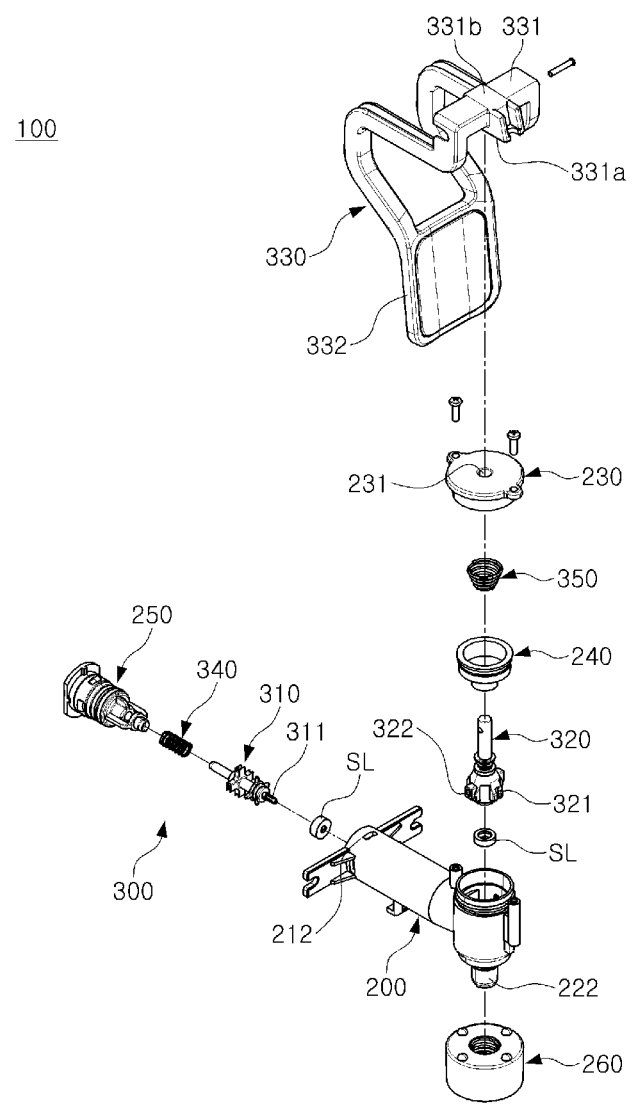
FIG. 2 is an exploded perspective diagram illustrating water discharging device according to an exemplary embodiment in the present disclosure.
Figure 3:
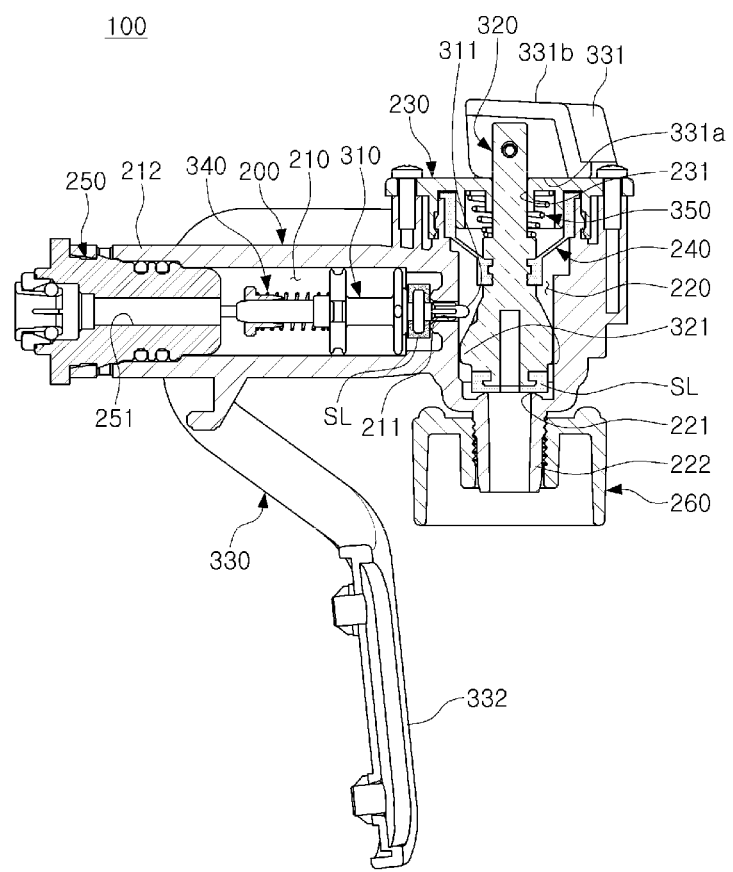
FIG. 3 is a cross-sectional diagram taken along line I-I' in FIG. 1.

FIG. 1 is a perspective diagram illustrating a water discharging device according to an exemplary embodiment. FIG. 2 is an exploded perspective diagram illustrating the water discharging device according to an exemplary embodiment. FIG. 3 is a cross-sectional diagram taken along line I-I' in FIG. 1.

Figure 4:
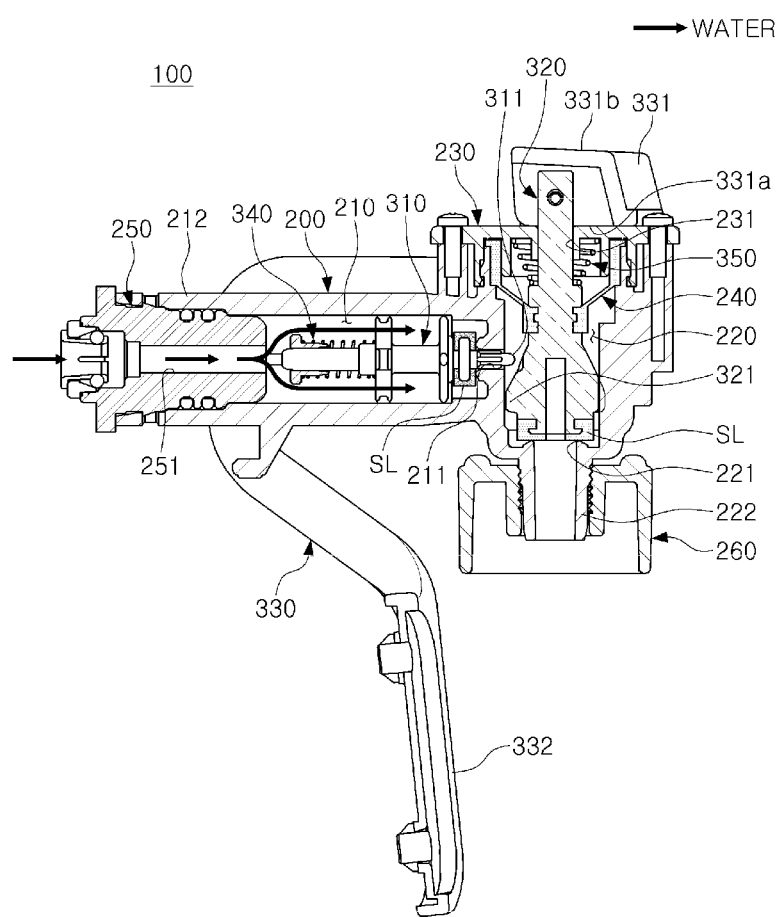
FIGS. 4 to 6 are cross-sectional diagrams illustrating operations of a water discharging device according to an exemplary embodiment in the present disclosure.
Figure 5:
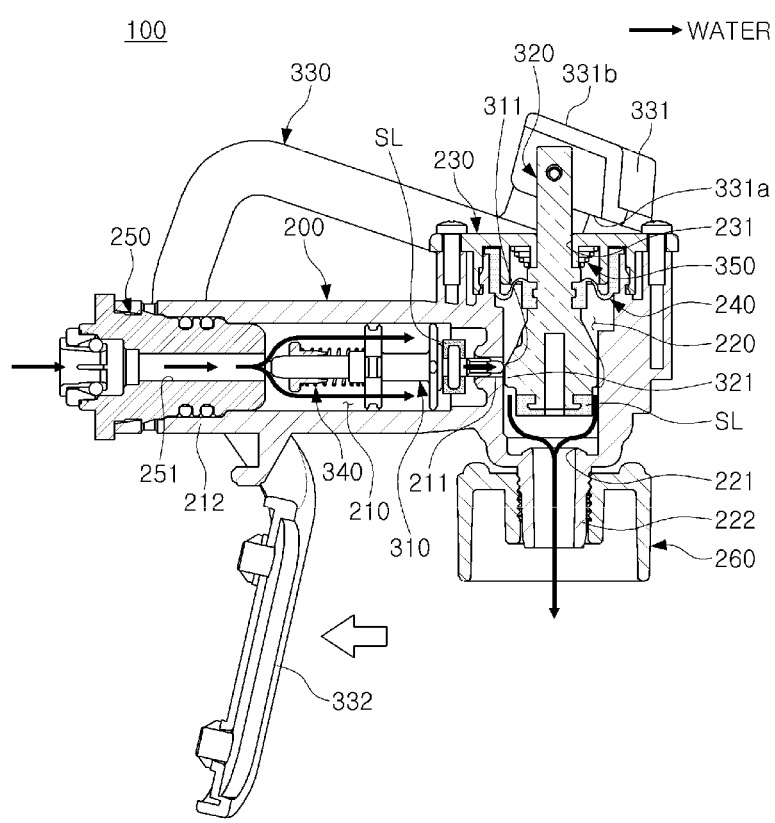
Figure 6:
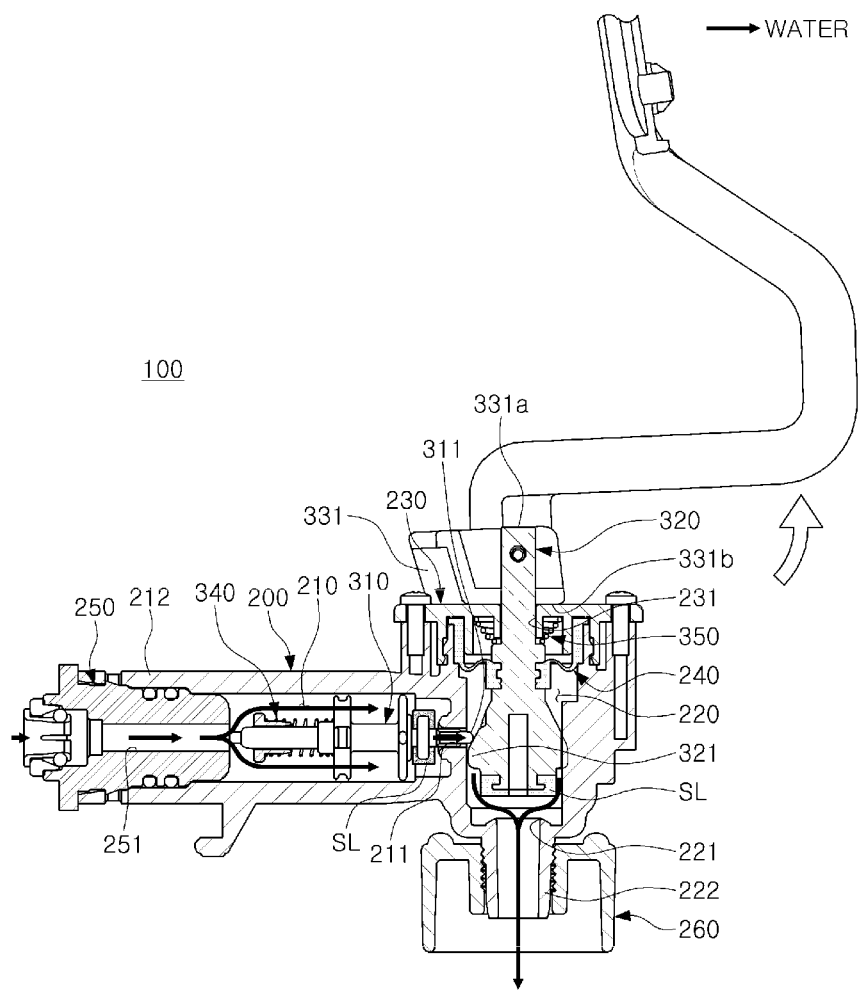

FIGS. 4 to 6 are cross-sectional diagrams illustrating operations of a water discharging device according to an exemplary embodiment.

A water discharging device 100 may include a body 200 and an opening and closing portion 300.

The body 200 may include a first water channel 210 and a second water channel 220.

The first water channel 210 may be connected to a water supply source (not illustrated) such as a storage tank in which water is stored. For example, the first water channel 210 may include a supply connection member 250 as illustrated in FIG. 2 to which a connection pipe connected to a water supply source is connected, as illustrated in FIG. 3, and the first water channel 210 may be connected to a water supply source through the supply connection member 250. The supply connection member 250 may include a water supply channel 251 connected to the connection pipe and the first water channel 210.

Accordingly, the water from a water supply source may flow into the first water channel 210 through the water supply channel 251 of the supply connection member 250 as illustrated in FIGS. 4 to 6. In this case, a portion of the body 200 forming a portion of the first water channel 210 in which the supply connection member 250 is provided may form an inlet 212 as illustrated in FIGS. 2 and 3.

The first water channel 210 may include a first opening and closing hole 211 opened and closed by a first opening and closing member 310 included in the opening and closing portion 300. The first water channel 210 may be configured to be disposed horizontally in the body 200 as illustrated in FIG. 3.

The second water channel 220 may be connected to the first water channel 210. Accordingly, as described above, the water flowing into the first water channel 210 may pass through the first water channel 210 and may flow into the second water channel 220 as illustrated in FIGS. 5 and 6 unless the first opening and closing hole 211 is not closed by the first opening and closing member 310.

The second water channel 220 may be connected to an external entity. The second water channel 220 may also include a second opening and closing hole 221 opened and closed by a second opening and closing member 320 included in the opening and closing portion 300. Accordingly, the water flowing into the second water channel 220 may pass through the second water channel 220 and may be discharged externally as illustrated in FIGS. 5 and 6 unless the second opening and closing hole 221 is not closed by the second opening and closing member 320.

The second water channel 220 may be configured such that a portion of the second water channel 220 connected to an external entity, and a portion opposing the portion connected to an external entity may be opened. The water passing through the second water channel 220 may be discharged externally through the opened portion of the second water channel 220 connected to an external entity.

The second water channel 220 may be configured to be disposed vertically in the body 200 as illustrated in FIG. 3.

The body 200 may include a cap member 230 covering the portion of the second water channel 220 opposing the portion connected to an external entity. The cap member 230 may include a through-hole 231, and a portion of the second opening and closing member 320 in the opening and closing portion 300 may penetrate through the through-hole 231. In the portion of the second opening and closing member 320 penetrating through the through-hole 231 of the cap member 230, a lever member 330 included in the opening and closing portion 300 may be rotatably disposed.

The cap member 230 may include a second elastic member 350 included in the opening and closing portion 300, and the second elastic member 350 may apply elastic force to the second opening and closing member 320 in the opening and closing portion 300.

The body 200 may include a water channel sealing member 240. The water channel sealing member 240 may be configured such that one portion of the water channel sealing member 240 is connected to the second opening and closing member 320, and the other portion of the water channel sealing member 240 is provided between the body 200 and the cap member 230. Accordingly, water passing through the second water channel 220 may be prevented from being discharged externally through the through-hole 231 of the cap member 230.

The portion of the body 200 in which the portion of the second water channel 220 is connected to an external entity may form an outlet 222 through which water is discharged. Also, the outlet 222 may be connected to an auxiliary discharging member 260 as illustrated in FIG. 3. The auxiliary discharging member 260 may be connected to the outlet 222 by a screw connection, but an exemplary embodiment thereof is not limited thereto. The auxiliary discharging member 260 may also be connected to the outlet 222 by fitting into the outlet 222, or by any other well-known methods.

By the auxiliary discharging member 260, when water is discharged externally from the second water channel 220, splashing of water may be reduced, and foreign objects may not flow into the second water channel 220.

The opening and closing portion 300 may include the first opening and closing member 310 and the second opening and closing member 320.

The first opening and closing member 310 may open and close the first opening and closing hole 211 of the first water channel 210 in the body 200. The first opening and closing member 310 may be moveably disposed in the first water channel 210 in the body 200 such that the first opening and closing member 310 may open and close the first opening and closing hole 211 of the first water channel 210.

As the second opening and closing member 320 moves in the second water channel 220 to open and close the second opening and closing hole 221 of the second water channel 220 in the body 200, the first opening and closing member 310 may move in the first water channel 210 and may open and close the first opening and closing hole 211.

The first opening and closing member 310 may include a protrusion 311. The protrusion 311 may protrude from the first opening and closing hole 211 in the body 200 and may be disposed in the second water channel 220 as illustrated in FIG. 3. Also, the opening and closing portion 300 may include a first elastic member 340 applying elastic force in a closing direction of the first opening and closing hole 211 of the first water channel 210 in the body 200. The first elastic member 340 may be provided in the supply connection member 250 and may support the first opening and closing member 310 by elastic force as illustrated in FIG. 3.

The first opening and closing member 310 may include a sealing member SL, and the first opening and closing hole 211 may be closed by the sealing member SL.

As illustrated in FIG. 5, when the second opening and closing member 320 moves to open the second opening and closing hole 221 of the second water channel 220 in the body 200, a pushing portion 321 provided in the second opening and closing member 320 may push the protrusion 311. Accordingly, the first opening and closing member 310 may overcome elastic force of the first elastic member 340 and move in an opening direction of the first opening and closing hole 211 of the first water channel 210 in the body 200.

Also, as illustrated in FIG. 4, when the second opening and closing member 320 moves to close the second opening and closing hole 221 of the second water channel 220 in the body 200, the first opening and closing member 310 may move to close the first opening and closing hole 211 of the first water channel 210 in the body 200 by elastic force of the first elastic member 340.

The second opening and closing member 320 may open and close the second opening and closing hole 221 of the second water channel 220 in the body 200. The second opening and closing member 320 may be movably provided in the second water channel 220 in the body 200 such that the second opening and closing member 320 may open and close the second opening and closing hole 221 of the second water channel 220.

The lever member 330 may be rotatably connected to the second opening and closing member 320. For example, a rotation connection portion 331 included in the lever member 330 may be rotatably disposed in a portion of the second opening and closing member 320 penetrating through the cap member 230 of the body 200. Also, the opening and closing portion 300 may include the second elastic member 350 applying elastic force in a closing direction of the second opening and closing hole 221 of the second water channel 220 in the body 200. As illustrated in FIG. 3, the second elastic member 350 may be provided in the cap member 230 and may support the second opening and closing member 320 by elasticity.

As illustrated in FIG. 5, a user may apply an external force to the lever member 330, more specifically to an external force applying portion 332 included in the lever member 330 so as to be connected to the rotation connection portion 331 of the lever member 330, and the lever member 330 may rotate to one side. Accordingly, the second opening and closing member 320 may overcome the elastic force of the second elastic member 350 and may move in an opening direction of the second opening and closing hole 221 of the second water channel 220 in the body 200. In this case, as described above, the pushing portion 321 of the second opening and closing member 320 may push the protrusion 311 of the first opening and closing member 310, the first opening and closing member 310 may overcome the elastic force of the first elastic member 340, and may move in an opening direction of the first opening and closing hole 211 of the first water channel 210 in the body 200.

Also, as illustrated in FIG. 4, when a user does not apply an external force to the external force applying portion 332 of the lever member 330, the second opening and closing member 320 may move to close the second opening and closing hole 221 of the second water channel 220 in the body 200 by the elastic force of the second elastic member 350, and the lever member 330 may rotate to the other side.

In this case, as described above, the first opening and closing member 310 may move to close the first opening and closing hole 211 of the first water channel 210 in the body 200 by elastic force of the first elastic member 340. The lever member 330 rotating to the other side may stop as a stopping surface 331a formed on the rotation connection portion 331 of the lever member 330 is in contact with the cap member 230.

The second opening and closing member 320 may include the sealing member SL, and the second opening and closing hole 221 may be closed by the sealing member SL.

As described above, as the second opening and closing member 320 moves in the second water channel 220 to open and close the second opening and closing hole 221 of the second water channel 220 in the body 200, the first opening and closing member 310 may move in the first water channel 210 in the body 200 such that the first opening and closing hole 211 of the first water channel 210 may be opened and closed.

Accordingly, even when leakage occurs as the first opening and closing hole 211 or the second opening and closing hole 221 is abraded by being repeatedly used, the opening and closing operations may be performed by the first opening and closing hole 211 or the second opening and closing hole 221, and thus, leakage occurring in the water discharging device 100 may be significantly reduced.

To this end, the pushing portion 321 may be provided in the second opening and closing member 320. The pushing portion 321 may push the protrusion 311 of the first opening and closing member 310 when the second opening and closing member 320 moves in an opening direction of the second opening and closing hole 221 of the second water channel 220 in the body 200 as described above and illustrated in FIG. 5.

The pushing portion 321 may be disposed in a portion of the second water channel 220 between the first opening and closing hole 211 of the first water channel 210 and the second opening and closing hole 221 of the second water channel 220 in the body 200. The pushing portion 321 may also be inclined to such that an internal surface of the second water channel 220 is brought towards the second opening and closing hole 221.

Accordingly, when the second opening and closing member 320 moves in an opening direction of the second opening and closing hole 221 of the second water channel 220 in the body 200 by the lever member 330, the pushing portion 321 may push the protrusion 311 of the first opening and closing member 310. Also, when the second opening and closing member 320 moves in a closing direction of the second opening and closing hole 221 by elastic force of the second elastic member 350, the pushing portion 321 may not push the protrusion 311 of the first opening and closing member 310. Accordingly, the first opening and closing member 310 may move in a closing direction of the first opening and closing hole 211 of the first water channel 210 in the body 200 by elastic force of the first elastic member 340.

As illustrated in FIG. 2, the second opening and closing member 320 may include a guiding portion 322 guiding a movement of the second opening and closing member 320 in the second water channel 220 in the body 200.

Also, as illustrated in FIG. 6, when the lever member 330 rotates to a consecutive discharging position, although an external force by a user is not applied to the external force applying portion 332 of the lever member 330, the second opening and closing member 320 may not move to close the second opening and closing hole 221 of the second water channel 220 in the body 200 by elastic force of the second elastic member 350. Accordingly, the first opening and closing member 310 may also not move to close the first opening and closing hole 211 of the first water channel 210 in the body 200 by elastic force of the first opening and closing member 310.

To this end, a consecutive discharging surface 331b being in contact with the cap member 230 may be formed on the rotation connection portion 331 of the lever member 330.

According to the aforementioned exemplary embodiment, in the water discharging device described above, as the second opening and closing member moves in the second water channel to open and close the second opening and closing hole of the second water channel, the first opening and closing member may move along the first water channel to open and close the opening and closing hole of the first water channel, thereby significantly reducing leakage occurring in the water discharging device.

While the exemplary embodiments have been shown and described above, it will be apparent to those skilled in the art that modifications and variations could be made without departing from the scope of the present invention as defined by the appended claims.

What is claimed is:

1. A water discharging device, comprising:
   a body including a first water channel connected to a water supply source, and a second water channel connected to the first water channel and to an external entity;
   a first opening and closing member configured to open and close a first opening and closing hole formed in the first water channel;
   a second opening and closing member configured to open and close a second opening and closing hole formed in the second water channel; and
   a cap member covering at least a portion of the second water channel opposing a portion connected to the external entity,
   wherein the first opening and closing member includes a protrusion protruding through the first opening and closing hole and disposed in the second water channel, and the second opening and closing member includes a pushing portion pushing the protrusion when the second opening and closing member moves in an opening direction of the second opening and closing hole.

2. The water discharging device of claim 1, wherein the pushing portion is disposed in a portion of the second water channel between the first opening and closing hole and the second opening and closing hole, and the pushing portion is inclined such that the pushing portion approaches an internal surface of the second water channel towards the second opening and closing hole.

3. The water discharging device of claim 2, wherein the first water channel is configured to be disposed horizontally in the body, and the second water channel is configured to be disposed vertically in the body.

4. The water discharging device of claim 2, wherein the first opening and closing member and the second opening and closing member are provided in an opening and closing portion, and
   wherein the opening and closing portion further includes a first elastic member configured to apply a first elastic force to the first opening and closing member in a closing direction of the first opening and closing hole, and a second elastic member configured to apply a second elastic force to the second opening and closing member in a closing direction of the second opening and closing hole.

5. The water discharging device of claim 4, wherein the opening and closing portion further includes a lever member rotatably disposed in the second opening and closing member such that the second opening and closing member moves in the second water channel.

6. The water discharging device of claim 5, wherein the second water channel is configured such that a portion of the second water channel connected to the external entity and a portion opposing the portion connected to the external entity are opened, and the second opening and closing member has a portion penetrating through a through-hole formed in the cap member such that the lever member is rotatably connected.

7. The water discharging device of claim 6, wherein the body further includes a water channel sealing member configured such that one portion of the water channel sealing member is connected to the second opening and closing member, and the other portion of the water channel sealing member is disposed between the body and the cap member, to prevent water passing through the second water channel from being discharged externally through the through-hole.

8. The water discharging device of claim 1, wherein the first opening and closing member moves along the first water channel to open and close the first opening and closing hole as the second opening and closing member moves in the second water channel to open and close the second opening and closing hole.

* * * * *